United States Patent

Walsh

[15] 3,693,067

[45] Sept. 19, 1972

[54] ADJUSTABLE PROPORTIONAL RESPONSE FOR BALANCEABLE SYSTEM

[72] Inventor: Thomas J. Walsh, Hatboro, Pa.

[73] Assignee: Leeds & Northrup Company, Philadelphia, Pa.

[22] Filed: Aug. 7, 1970

[21] Appl. No.: 62,064

Related U.S. Application Data

[63] Continuation of Ser. No. 758,457, Sept. 9, 1968, abandoned.

[52] U.S. Cl.....................................318/609, 318/610

[51] Int. Cl.............................................G05b 11/36

[58] Field of Search...............................318/609, 610

[56] References Cited

UNITED STATES PATENTS

| | | | |
|---|---|---|---|
| 3,081,425 | 3/1963 | Newbold | 318/610 X |
| 3,377,548 | 4/1968 | Newbold | 318/610 X |
| 3,441,836 | 4/1969 | Riley | 318/610 X |

*Primary Examiner*—T. E. Lynch

*Attorney*—William G. Miller, Jr. and Raymond F. MacKay

[57] ABSTRACT

A balanceable system which utilizes a high gain amplifier to provide a signal causing a change in the state of the element which is to be maintained in proportional relationship to the magnitude o an input signal to the high gain amplifier. The amplifier also responds to a system feedback signal which is derived from a variable potentiometer across which is impressed the sum of a feedback signal representing the state of the element and a feedback signal which is an adjustable portion of the output signal of the amplifier. The adjustment of the variable potentiometer provides an adjustment of the proportional relationship between the input signal and the state of the element while the variable portion of the amplifier output signal provides for an adjustment of the effective gain of the system.

3 Claims, 1 Drawing Figure

PATENTED SEP 19 1972
3,693,067
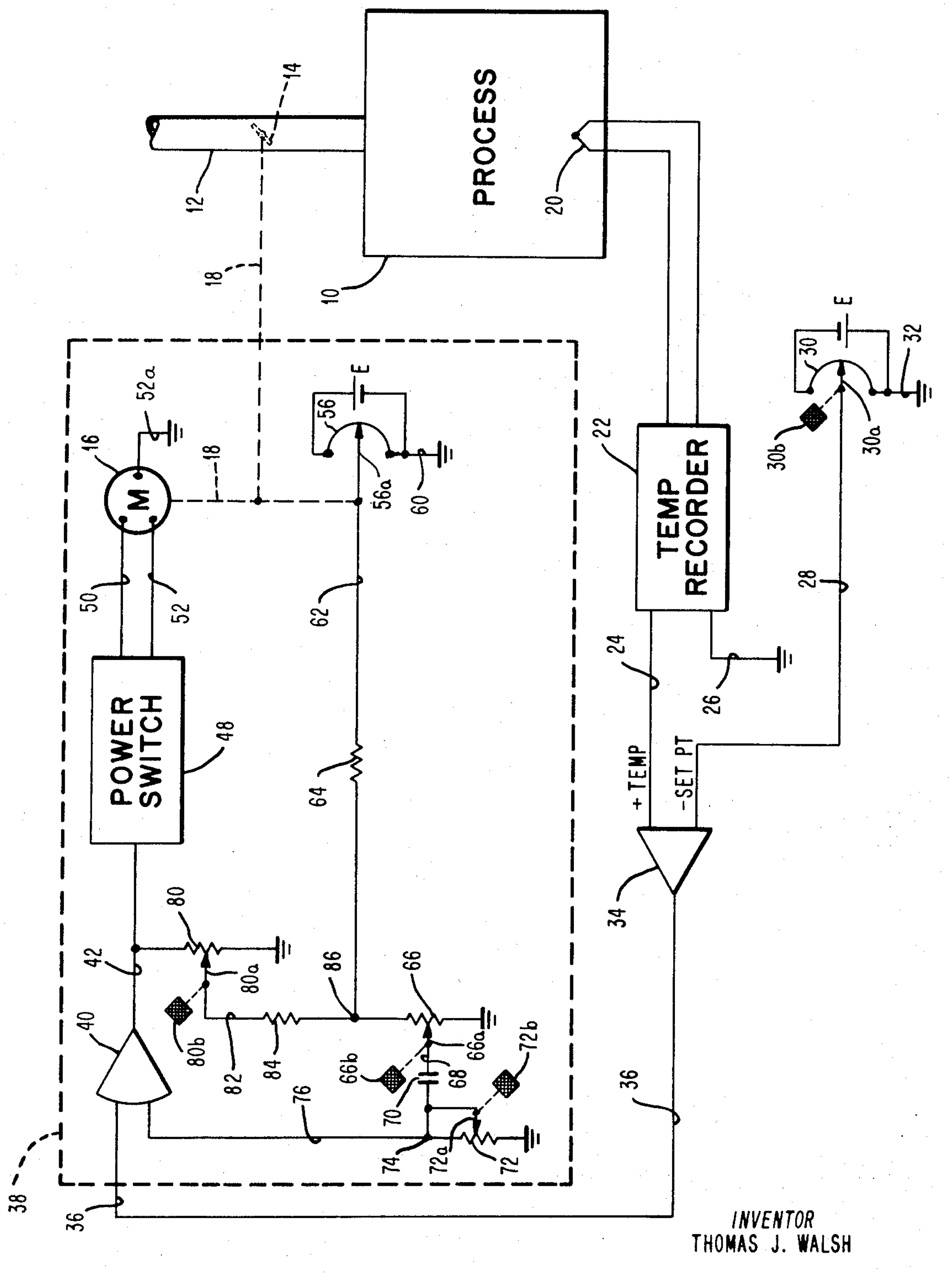
INVENTOR
THOMAS J. WALSH
BY William G. Miller Jr.
AGENT

ADJUSTABLE PROPORTIONAL RESPONSE FOR BALANCEABLE SYSTEM

CROSS REFERENCES TO RELATED APPLICATIONS

This application is a continuation of application Ser. No. 758,457, filed Sept. 9, 1968, now abandoned.

BACKGROUND OF THE INVENTION

This invention relates to a method and means for controlling the state of an element in a balanceable system so that it has an adjustable proportional relationship to the magnitude of an input signal and more particularly this invention relates to such a system in which the adjustment of the proportional relationship can be made without affecting the sensitivity of the system.

More particularly this invention relates to process controllers which have an improved arrangement for adjusting the gain of the controller as well as an improved arrangement for adjusting the proportional response of the controller without affecting the sensitivity of the controller.

In the past, the gain adjustment of the high gain amplifiers used in process controllers of the electrical type has been accomplished either by means of an adjustable potentiometer connected to provide negative feedback directly from the output of the amplifier to the input or by merely reducing the forward gain. In such circuits it has been necessary to readjust the gain setting after changes in the potentiometer setting providing the proportional response adjustment. Such a change in the gain setting was necessary to maintain the same sensitivity in the controller after the change in the setting of the proportional response. Such an arrangement for changing the gain of the amplifier has, of course, been disadvantageous in other respects in that it failed to provide the high open circuit gain of the amplifier to make the controller sensitive to small error signals. The present invention has as an object the overcoming of these disadvantages without increasing the complexity of the controller circuit or other balanceable system and without introducing other disadvantages.

SUMMARY OF THE INVENTION

In carrying out the present invention there is provided a method for controlling the state of an element in a balanceable system so that the state of the element will have a proportional relationship to the magnitude of an input signal with that relationship being adjustable without affecting the sensitivity of the system. The steps of this method include producing a first feedback signal representative of the state of the element, producing a total feedback signal in response to the first feedback signal and representative of an adjustable portion of the first feedback signal as well as comparing the input with the system feedback signal. The production of the control signal which modifies the state of the element so as to tend to reduce the control signal to zero is in response to the comparison of the total feedback signal and the input signal. The first feedback signal and a second feedback signal responsive to the control signal are added so that the total feedback signal represents an adjustable portion of the sum of those two signals.

BRIEF DESCRIPTION OF THE DRAWING

The drawing is a circuit diagram, partially in block form, showing one form of the novel method as it is applied to a control circuit in a typical process control environment.

DESCRIPTION OF THE PREFERRED EMBODIMENT

In the FIGURE there is shown a balanceable system in the form of a typical process control application which involves a process 10 which may, for example, be a process requiring heat input supplied by fuel introduced through the pipe 12 in a manner such that its rate of flow through the pipe 12 is under the control of a valve such as a butterfly valve 14 which is subject to adjustment by motor 16 through the mechanical coupling 18.

The process 10 may, for example, be a process in which it is desired to control the temperature at a particular point. For the purpose of measuring the temperature, which in this case is the controlled variable, there may be utilized a thermocouple such as thermocouple 20. Thermocouple 20 is shown connected to a temperature recorder 22 which serves to record the temperature measured by the thermocouple 20 and acts to retransmit over an output line 24 a potential with respect to the ground connection 26 indicative of the temperature measured by the thermocouple 20.

There is normally a particular desired temperature which is required for the proper control of the process. That temperature is known as the set point for the process and may be represented by a potential on line 28 which is obtained by adjustment of knob **30*b* which adjusts manually the position of the sliding contact 30*a* across potentiometer slidewire 30. The slidewire 30 is shown as being shunted across a power supply E such that the positive terminal of the power supply is grounded through the connection 32 so that the potential supplied on line 28 is of negative potential as compared with the positive potential supplied on line 24**.

By means of operational amplifier 34 which has as its input lines 24 and 28, there is provided on the output line 36 a potential indicative of the difference between the temperature measured by thermocouple 20 and the set point or desired temperature. This error signal is introduced as the input to controller 38 and more particularly an input signal to the high gain amplifier 40 which is incorporated as one of the elements of the balanceable system of controller 38. The signal which appears on line 36 in the form of a potential indicative of the deviation of the temperature from its set point is desirably reduced to zero by the controller 38 in order to maintain the process 10 under control.

In order to modify the manipulated variable by the adjustment of valve 14 so as to reduce the signal on line 36 towards zero and maintain it at zero, the controller 38 must incorporate the basic controller responses such as proportional action which provides for a positioning of the valve 14 by an amount proportional to the error signal on line 36. There will usually also be required a reset action for changing the positioning of valve 14 in response to the integral of the error signal on line 36.

As pointed out, one common form of process controller which would normally be used to accomplish the proportional and reset control above mentioned would include a high gain amplifier 40, as shown in the FIGURE but the amplifier would include a potentiometer directly connecting its output line 42 to its input so as to provide a means for adjusting the gain of the amplifier 40. Normally, that gain would require adjustment when the proportional band is adjusted to maintain in the system a constant sensitivity.

It is undesirable to incorporate the gain adjustment for the amplifier in such a manner or in the forward path of the amplifier because of the several disadvantages which such arrangements were found to have in a circuit of the type shown such as separate adjustment following a change in proportional band. Instead of adjusting the gain in such a manner, another circuit arrangement for providing a gain adjustment is utilized in accordance with this invention as will be described subsequently. Before describing the novel circuit there will be described the normal components found in process controllers of the type shown in the figure.

In process controller 38 the output of the amplifier 40 on line 42 is supplied to a power switch such as that shown in block form as power switch 48. The power switch then provides on its output lines 50 and 52 the necessary power to cause motor 16 to rotate in either a forward or reverse direction depending whether the power supply line over 50 and 52 is in one phase orientation or another. Depending upon the type of motor used for motor 16 the lines 50 and 52 may selectively carry power depending whether or not a forward or reverse direction is desired for motor 16 in response to the signal on line 42. A third connection to motor 16 is provided by way of a ground connection 52a and the motor 16 is connected as previously mentioned by way of the mechanical coupling 18 to adjust the position of the element shown as valve 14.

The mechanical coupling 18 is also connected to the slider 56a of slidewire potentiometer 56 so as to move that slider along potentiometer slidewire 56 in accordance with the positioning of the valve 14. Since the slidewire 56 is provided by a power supply in shunt thereto, namely battery E, which has one of its terminals connected by way of connecting line 60 to ground, there is provided on line 62 from the slider 56a a signal in the form of a potential which is indicative of the state of the control element. In this particular example the control element is valve 14 and its state is its position. In other control arrangements the process may incorporate a control element other than one which requires a change in position, thus the arrangement in the figure which shows a motor adjusting the position of a valve is exemplary only of one type of control arrangement. Regardless of the type of control arrangement it is usually necessary to provide a first feedback signal representative of the state of the control element as a basis for providing a system feedback signal to amplifier 40.

In the arrangement shown in the figure, the signal on line 62 in the form of a varying voltage is introduced into a network including a fixed resistor 64 and an adjustable signal divider in the form of potentiometer 66 so arranged that the manually adjustable tap 66a of the potentiometer 66, which is positioned by knob 66b, will provide on line 68 a signal in the form of a potential which is a predetermined proportion of the potential on line 62. That predetermined proportion provides a modification of the first feedback signal which is the basis of the proportional response of the controller 38 and hence the proportional relationship between the input signal on line 36 and the state of the element 14.

In order to provide for a reset response for controller 38 the line 68 is connected to a serially connected combination of capacitor 70 and variable resistor 72 whose adjustable tap 72a is set by knob 72b to establish the reset rate for controller 38. The combination of the capacitor 70 and the adjustable resistor 72 provide the integrating response for controller 38 by virtue of the introduction of the potential taken from a point intermediate between capacitor 70 and variable resistor 72, namely from point 74. That potential is connected by way of line 76 as one input to amplifier 40, namely the feedback signal for that amplifier. Characteristically, the feedback signal provided on line 76 is of polarity to oppose the signal on line 36 so as to tend to reduce the output of amplifier 40 on line 42 toward zero as the controller 38 positions the valve 14 in a direction to cause the temperature in the process as measured by thermocouple 20 to move toward its set point. Thus, in amplifier 40 the input on line 36 is compared to the feedback on line 76 and the control signal on line 42 has a magnitude related to the difference.

The above described manner of providing a proportional and reset response in an electrical controller are well known, where the gain adjustment of the amplifier is provided by means such as a potentiometer connected in a feedback path or forward path for the amplifier. In the novel circuit of this invention, however, the effective gain of the amplifier is established by modifying the effect of the signal obtained from line 62 which is indicative of the state of the control element in accordance with and in proportion to the magnitude of the control signal established on line 42. Such a modification is carried out by the use of an adjustable potentiometer 80 whose slider 80a is manually set by means of knob 80b so as to provide by way of line 82 through fixed resistor 84 to the junction point 86 a potential related to the potential on line 42 by the adjustment of the slider 80a which serves to tap off of the potentiometer 80, whose resistor element connects line 42 to ground, a second feedback signal which is a portion of the control signal on line 42.

It will be seen that by modifying the feedback signal supplied on line 76 by the introduction of a second feedback signal proportional to the control signal on line 42, which is summed with the first feedback signal on line 62, there is thereby provided means for establishing the effective gain of the amplifier 40 by adjusting 80b and a proportional band adjustment made by 66b will not affect the sensitivity of the system.

It will be evident to those skilled in the art that by virtue of the inclusion of the capacitor 70 in the circuit between line 42 and line 76 the open loop gain of the amplifier 40 is effective to enable the amplifier 40 to respond to very small changes in the potential on line 36 representative of the error and hence the sensitivity of the amplifier is enhanced as compared to the sensitivity which would be effective if the gain of the amplifier were established by a potentiometer in the feedback path or forward path of the amplifier.

It will also be evident to those skilled in the art that the introduction of the gain adjusting circuit at the terminal 86 will be effective to minimize the necessity for any readjustment of the amplifier gain adjustment whenever the proportional band is adjusted, as by adjustment of knob 66*b*, which has been normally required in prior art controllers to maintain a constant sensitivity for the system. Such a readjustment of the gain setting becomes unnecessary in the novel circuit of the present invention in that any modification of the proportional band by the adjustment of knob 66*b* and the consequent change in position of potentiometer tap 66*a* modifies the effect in the feedback circuit of the signal introduced by way of the gain adjusting circuit to terminal 86 so that the effect of the feedback provided by way of potentiometer 80 and fixed resistor 84 is automatically compensated to accommodate the changes in response which occur as a result of readjustment of the slider 66*a*. Thus, the effective gain of the balanceable system is modified as the proportional relationship between the input signal and the adjustment of the state of the element is modified and a constant sensitivity for the system results.

While the arrangement shown in the figure is specific to the type of control illustrated, it will be evident to those skilled in the art that the principle established by the introduction of the amplifier gain adjustment as part of the feedback circuit providing the controller functions can be utilized in other forms of balanceable systems for providing the same benefits as those mentioned above.

The following values are exemplary of values which can be used for the various parameters of the controller 38:

| | |
|---|---|
| Amplifier | Gain |
| 40 | 20,000 to 50,000 |
| Resistance | Ohms |
| 56 | 1 K |
| 64 | 12 K |
| 66 | 30 K |
| 72 | 82 M |
| 80 | 10 K |
| 84 | 15 K |
| Capacitor | μf |
| 70 | 18 |

What is claimed is:

1. In a balanceable system for controlling the position of an element to maintain an adjustable proportional relationship between the change in the position and the change in the magnitude of an input signal; the combination comprising, an amplifier for producing a control signal in response to an unbalance between its inputs, said input signal being applied as a first of the inputs of said amplifier, means responsive to said control signal for changing the position of said element in sense corresponding to the sense of said control signal, said change continuing until said control signal has been reduced substantially to zero, means responsive to the position of said element for producing a first feedback signal representative of, said position means responsive to said control signal for producing a second feedback signal representative of, a portion of the magnitude of said control signal an adjustable signal divider operable to sum said first and second feedback signals and to supply a total feedback signal responsive to an adjustable part of the sum of said first and second feedback signals as a second input to said amplifier so that an adjustment of said signal divider is effective to change said proportional relationship while maintaining unchanged the sensitivity of said balanceable system.

2. A balanceable system as set forth in claim 1 in which the portion of the magnitude of said control signal of which the second feedback signal is representative is adjustable to determine the effective gain of the amplifier.

3. A process controller for varying the state of a control element in response to the deviation between a controlled variable and its set point for controlling the manipulated variable so that the magnitude of the controlled variable is caused to change toward its set point comprising means for producing a first feedback signal indicative of the state of the control element, amplifying means for producing a control signal in response to the difference between the magnitude of an error signal established as the deviation between the magnitude of the controlled variable and its set point and the magnitude of a total feedback signal derived from said first feedback signal, means for changing the state of the control element in response to the control signal so as to cause resulting variations in the manipulated variable to change the controlled variable so as to change said error signal towards zero, means responsive to said first feedback signal for producing said total feedback signal, said means including a potentiometer providing an adjustable tap for setting the proportional response of the controller, said potentiometer being connected at one end to said first mentioned means so as to provide, between said variable tap and the other end of said potentiometer, a signal which is a predetermined proportion of said first feedback signal, a series connected capacitor and variable resistor connected to shunt that portion of said potentiometer producing said predetermined proportion of said first signal to provide a reset response to said controller, means for connecting a circuit point between said capacitor and said variable resistor to one input of said amplifying means as the total feedback signal with a polarity such that it tends to oppose the error signal so as to reduce the control signal toward zero as the state of the control element is varied in a direction tending to reduce the error signal toward zero, and an adjustable gain determining potentiometer for connecting a portion of the control signal to that end of the proportional response potentiometer connected to said first mentioned means so as to determine the proportional gain of the controller in a way which provides for a substantially constant sensitivity for said controller to variations of said error signal.

* * * * *